May 8, 1934.     F. H. WATSON     1,957,866
STUB TYPE VALVE STEM
Filed March 6, 1931
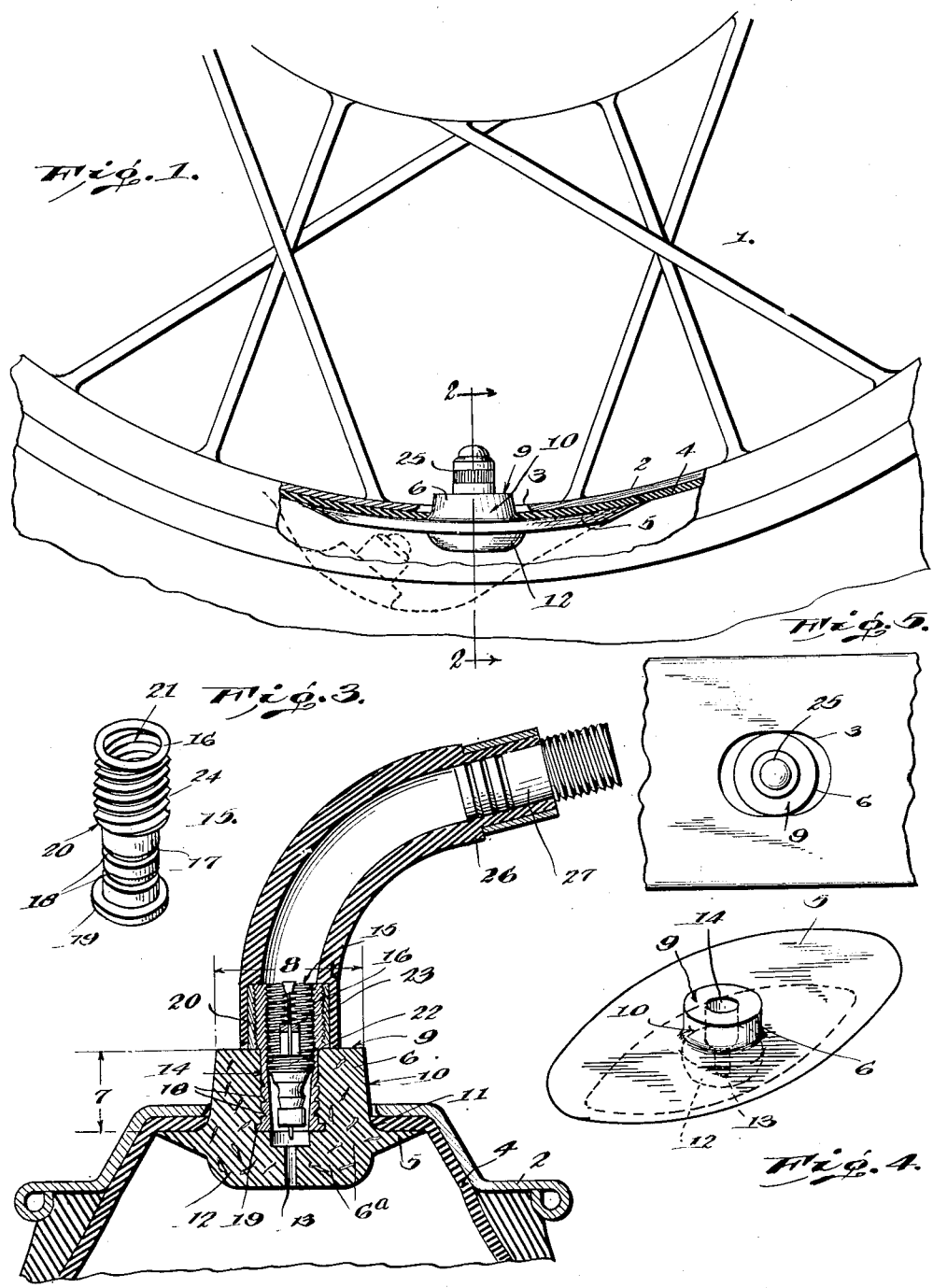

Patented May 8, 1934

1,957,866

UNITED STATES PATENT OFFICE 1,957,866

STUB TYPE VALVE STEM

Frank H. Watson, Jonesboro, Ark., assignor to The F. H. Watson Company, Little Rock, Ark., a corporation of Delaware Application March 6, 1931, Serial No. 520,603

1 Claim. (Cl. 152—12)

This invention relates to improvements in pneumatic tires and it consists of the constructions, combinations and arrangements herein described and claimed.

An object of the invention is to provide a pneumatic inner tube having an integral valve stem of extremely diminutive proportions insofar as its extension beyond the adjacent normal surface of the tube is concerned, one of the outstanding purposes of this characteristic being the extreme facility with which the valve stem can be withdrawn through its opening in the rim in the event of a punctured tube, both the facility of said withdrawal and the stockiness of the valve stem being contributing factors toward avoiding damage to the tube. Another advantage and purpose of the invention is to provide a stem construction in which the radial projection of the stem inwardly of the wheel will be materially reduced, adapting it particularly for wheels in which radial clearance is small, as for example truck wheels, in which not infrequently the circumference of the brake drum approaches very closely the wheel rim.

Another object of the invention is to provide a valve stem which, even though of the stub type, embodies the generally tapering configuration developed in the patent of Frank H. Watson, dated May 5, 1931, No. 1,804,294.

A further object of the invention is to provide a valve stem so combined with a pneumatic inner tube, and so arranged in its proportions that portions of the core container and core, the latter being otherwise known as the valve insides, extend in part within the confines of the tube.

A further object of the invention is to provide a wheel of the drop-center type having an opening for use in connection with the valve stem, this opening being of a size and shape which will permit the ready insertion and withdrawal of the valve stem, as for example oval, elliptical, or oblong, it being here shown as elongated, in order to facilitate the slipping out of the valve stem, especially when the extension filling tube is permitted to remain in place as later brought out.

Another object of the invention is to fasten a certain metallic part in the rubber by vulcanization, thereby to absolutely insure against leakage, the rubber itself being of a fibrous composition so as to combine maximum inherent strength without necessitating the use of reinforcing fabric.

Other objects and advantages will appear in the following specification, reference being had to the accompanying drawing in which Figure 1 is a partial side elevation of a wheel having the improved inner tube and valve stem incorporated therein, parts of the rim and tube being shown in section to more clearly illustrate the internal construction.

Figure 2 is a cross section as though taken on the line 2—2 of Figure 1, but in place of the cap having an extension filling tube either permanently or temporarily connected with the core container.

Figure 3 is a detail perspective view of the core container.

Figure 4 is a perspective view of the valve stem and flap.

Figure 5 is a detail plan view of a portion of the wheel felly showing the valve stem in place in the elongated hole here shown as one form of rim aperture.

Inasmuch as brief allusion has been made to the Patent No. 1,804,294, May 5, 1931 of Frank H. Watson, it may be further stated that the underlying purpose of the present stub type valve stem is to facilitate the withdrawal of the air receiving apparatus of the inner tube through the hole in the wheel rim in the event of a puncture and, moreover, to avoid injury to the inner tube or to the valve stem itself during the subsequent doubling over and more or less rough usage always occurring prior to bringing the vehicle to a stand still. The generally tapering configuration of the valve stem of the foregoing application is preserved herein, the purpose of this being to make sure that there are no enlarged projections or outstanding parts stepped outwardly from the valve stem or its appurtenances in the direction of the extremity to hang on the edges of the hole and so obstruct the foregoing withdrawal.

In the drawing the wheel generally denoted 1, includes a rim 2 which has a hole 3 for the valve stem according to custom. The particular rim shown (Fig. 2) is of the drop center type, although the principles of the present valve stem would work as well if the latter were incorporated in a wheel rim of another type.

This hole 3 is preferably of an elongated form (Fig. 5), and to this end may be known either as elliptical, oval or oblong. The major axis lies in the circumferential direction of the rim 2; the distance across the minor axis is approximately equal to the diameter of that part of the valve stem protruding through. This type of hole, as distinguished from an ordinary round hole, has outstanding advantages which are described in connection with other parts of the valve stem.

The pneumatic inner tube 4 has a flap 5 secured interiorly thereof and preferably vulcanized thereto. As observed in Figures 1 and 2 the flap 5 is located on the inside of the tube 4, the advantage of this particular arrangement being the tendency of the internal air pressure to keep the flap pressed against the inner wall of the tube, and so aid in defeating any separation that might possibly occur.

On the upper flat side of the flap 5 there is a valve stem 6. This is usually made of the same material as the flap, namely rubber. The valve stem is preferably made integral with the flap, and if by any chance the valve stem 6 is manufactured separately from the flap and applied later, the union of the two must be of such a nature that it will be impenetrable by air.

It was just stated that the valve stem and flap are composed of rubber. This is a fibrous rubber, comprising a composition of rubber and cotton. The fibers are denoted 6ª in Figure 2, although an inspection of the finished product does not reveal any fiber on the surface.

By using a fibrous rubber material strength and stiffness are imparted to the flap and valve stem, overcoming the tendency to balloon when under high pressure. Moreover, the prevailing necessity of embodying reinforcing fabric in the valve stem is entirely avoided. This step reduces the cost of manufacture, and the stems are actually stronger than they would be with the fabric in them.

The valve stem is extremely short, hence its term stub type. Its height 7 (Fig. 2) is less than its diameter 8. The top 9 is plane, but the sides 10 are tapering. In practice the curve 11 where the sides of the valve stem merge into the flat surface of the flap 5 may relatively be so pronounced as to give the otherwise cylindrical shape of the stem 6 a tapering appearance. Thus it is optional whether the sides 10 shall actually be tapering or whether they shall be straight and the curve 11 made of such proportions as to give the outside of the stem 6 the tapering aspect.

Extending below the flap 5 is an integral button 12 (Fig. 2). This is merely an enlargement or reinforcement approximately the same in diameter as the base of the valve stem 6. This button has a passage 13 which communicates with a bore 14 in the valve stem 6. This bore extends lengthwise of the valve stem 6 and ends well below the adjacent normal surface of the inner tube 4.

The purpose in this arrangement is to establish or incorporate the core container 15 (Fig. 3) well within the valve stem 6 and even within the confines of the tube 4 itself. This core container comprises a nipple 16 which is exposed above the top 9 of the valve stem 6. It includes a slightly reduced tubular part 17 which is fixed in the bore 14. The tubular part 17 is vulcanized in the rubber stem 6 thus precluding every possibility of leakage, eliminating the necessity of a ferrule and reducing the cost of manufacture. To this end the surface of the tubular part is interrupted with ridges or other equivalent means 18 and terminates at the bottom in a flange 19 which will overcome all attempts to pull the core container out.

By virtue of the tubular part 17 being reduced there results a shoulder 20 beneath the nipple 16 which rests on the top 9 and so limits the insertion of the core container 15, insuring accurate and uniform assembly for the reason that these metal valve parts are standardized and the shouldered core container will always assemble uniformly with the stem member of the tire. The core container is threaded at 21 on the inside to receive the member 22 of a conventional valve insides or core generally denoted 23. The core 23 is substantially co-extensive with its container 15.

At this point the relationship of the core container 15 to the valve stem 6 is to be noted. It has been stated already that the core container, specifically the reduced tubular part 17, extends to a point within the confines of the inner tube 4. This circumstance converts the core container into a reinforcement for the valve stem 6.

The core container thus constitutes a central stiffener for the valve stem. The natural motion of the wheel 1 tends to set up a degree of creeping of the inner tube 4 in reference to its casing and to the rim 2. This creeping would naturally be perceptible at the hole 3. Were it not for the extension of the tubular part 17 through the valve stem 6 to a point well below the hole 3 the side pressure of the edge of the hole against the valve stem 6 might cause a distortion or tearing or some other deleterious action that would be a disadvantage to the assemblage in general.

However, the presence of the tubular part 17 in the major length of the stem 6 virtually converts the latter into a perfectly rigid part insofar as perceptible yielding is concerned, so that any tendency of the tube 4 to creep relatively to the rim 2 is at once stopped.

External threads 24 on the nipple 16 serve two purposes. Either a cap 25 (Fig. 1) or an extension filling tube 26 (Fig. 2) may be screwed on. In some types of wheels there is room enough between the spokes and below the brake drum to enable inserting the ordinary air chuck for the filling of the tire. Figure 1 may be regarded as illustrating such a type of wheel.

In other wheels, especially those of large trucks, there is not room enough for the necessary manipulation of the customary air chuck. To meet this condition, the extension tube 26 is screwed on in place of the cap 25. This extension tube may be permitted to remain, or it may be taken off as desired. The free extremity of this tube carries a threaded nipple 27 on which the cap 25 may be screwed in case it is decided to let the tube 26 remain.

But the extension tube 26 has another and perhaps more important purpose than just described. The valve stem 6 and its superimposed nipple 16 will be somewhat difficult to locate in the hole 3 because of the extreme over-all shortness. Therefore, in the assemblage of the rim 2 and tube 4 the extension 26 may be temporarily affixed to the nipple 16 so as to enable drawing the valve stem 6 in place in the hole and later preliminarily filling the inner tube with enough air to hold it in place. After that the extension 26 may either be removed or permitted to remain in place as already pointed out.

At this time the advantage of the elongated hole 3, which is the preferable form, (Fig. 5) can be understood. Assume that the extension 26 is permitted to remain as a permanent fixture. In the event of a puncture the resulting dragging away of the inner tube 4 will pull the extension 26 through the hole 3. If this hole were round there might be an abrupt pinching of the extension stem and resulting damage to the inner tube, unless the round aperture were made of very considerable size.

The hole 3, being elongated in the circumferential direction of the wheel, renders the passage of the stem into the tire casing more easy and effective, without any restriction and to the end of a total prevention of damage. As already intimated, a round hole will not accomplish this result unless it is made of large size which might not be feasible because of removal of too much material from the rim with the consequent weakening of the rim transversely. The hole is preferably elongated, and although it may be embodied in rims of various types yet it works to special advantage in connection with a rim of the drop-center type.

Reverting to the button 12, the main purpose of this is to avoid injury to the tube on the pavement side of the tire, that is to say, on the side opposite to that where the valve stem 6 is located. It can be understood that if the flange 19 was permitted to come flush with the under side of the flap 5, the exposed metal might and probably would cut into the tube on the opposite side in the event of deflation. The button 12 provides a reinforcement or buffer around the inner extremity of the tubular part 17 so that the foregoing possibility cannot occur.

It is notable that the diameter of the cap 25 is less than that of the stem 6. In the event of inner tube deflation the valve stem 6 can readily pull through the hole 3, (dotted lines, Fig. 1) without the slightest interference on the part of the cap 15.

Even the extension tube 26 and its terminal nipple 27 preserve the generally tapering shape already alluded to. In case of a tire deflation with the tube 26 in place, the assemblage would be drawn through the hole 3 almost as easily as though the tube 26 were not in place.

It has been stated that the use of a fibrous rubber avoids the need of a reinforcing ferrule. By this is meant that no kind of a band or other clamping device around the stem 6 is needed to contain the rubber when the cap 25 is screwed down.

This arrangement has another important advantage. The valve cap 25 will be screwed down until the edge seats itself on the surface of the top 9. Customarily valve caps are provided with rubber gaskets on the inside to make an air seal at the top edge of the core container. The manufacture and insertion of these rubber gaskets multiply the expense, but according to the arrangement described they can be dispensed with.

It will be clear from the foregoing description and the drawing that a radially compact rugged stem is provided. The short relatively large stem-member extending radially outwardly combined with the thickened protuberance extending radially inwardly from the base-member give a sturdy make-up with a minimum of radial projection. The diameter of the stem-member is such as to give a yielding mass about the rigid valve parts so as to absorb and protect them from side thrusts, and, in turn, prevent them from causing injury to the tube or tire parts. Again the yieldable material of the stem member about the valve parts will absorb withdrawal strains and stresses so as to prevent disturbance of the assembled parts. The thickened portion on the inner side of the base member not only adds to the stem length sufficiently to provide ample room for seating the valve parts, but also forms a protecting area over the lower end of the valve-parts embedded in the bore to absorb end thrusts.

While the construction and arrangement of the improved stub type valve stem is that of a generally preferred form, obviously modifications and changes may be made without departing from the spirit of the invention or the scope of the claim.

I claim:—

A valve stem comprising a base member and an externally unconfined integral stem portion made of a composition comprising rubber and intermixed fibres, the stem being provided with a through aperture, and valve means positioned in the aperture in the stem portion.

FRANK H. WATSON.